United States Patent
Likos

(12) 
(10) Patent No.: US 6,287,462 B1
(45) Date of Patent: Sep. 11, 2001

(54) ALTERNATE SANITIZER FOR SAND FILTER

(75) Inventor: Nicholas Likos, Belleville, NJ (US)

(73) Assignee: H-Tech, Inc., Wilmington, DE (US)

(*) Notice: Subject to any disclaimer, the term of this patent is extended or adjusted under 35 U.S.C. 154(b) by 0 days.

(21) Appl. No.: 09/280,616

(22) Filed: Mar. 29, 1999

(51) Int. Cl.[7] .............................. B01D 24/00; B01D 35/00
(52) U.S. Cl. ......................... 210/169; 210/279; 210/284; 210/288
(58) Field of Search ....................... 210/232, 169, 210/256, 283, 284, 288, 501, 440, 279, 425

(56) References Cited

U.S. PATENT DOCUMENTS

| | | | |
|---|---|---|---|
| 2,435,975 | * 2/1948 | McGill | 210/256 |
| 4,141,824 | 2/1979 | Smith | 210/203 |
| 4,504,387 | 3/1985 | LeMire et al. | 210/206 |
| 4,954,252 | 9/1990 | Griffin et al. | 210/136 |
| 5,006,245 | 4/1991 | Yukishita | 210/256 |
| 5,171,442 | 12/1992 | Nakshbendi | 210/256 |
| 5,205,932 | * 4/1993 | Solomon et al. | 210/264 |
| 5,277,802 | * 1/1994 | Goodwin | 210/202 |
| 5,279,748 | 1/1994 | Hackett | 210/757 |
| 5,562,824 | * 10/1996 | Magnusson | 210/283 |
| 5,656,159 | 8/1997 | Spencer et al. | 210/206 |
| 5,762,785 | * 6/1998 | Ruiz | 210/169 |
| 6,004,458 | * 12/1999 | Davidson | 210/206 |
| 6,090,285 | * 7/2000 | Chau | 210/284 |

* cited by examiner

Primary Examiner—Duane Smith
Assistant Examiner—Frank M. Lawrence
(74) Attorney, Agent, or Firm—Selitto, Behr & Kim

(57) ABSTRACT

A fluid sanitizer includes a substantially cylindrical cartridge for containing sanitizing media such as a silver bactericide. The sanitizer inserts into an existing filter in the normal filter flow path and permits filtering and backwashing. The cartridge is a full flow design and may either be packed bed or loosely packed to become fluidized under filtering conditions. Sand filters with either top-mounted or side-mounted valves may be retrofitted with the sanitizer with no or minimal modifications.

21 Claims, 8 Drawing Sheets

ALTERNATE SANITIZER FOR SAND FILTER

FIELD OF THE INVENTION

The present invention relates to water treatment devices and more particularly to water sanitizers utilizing an antimicrobial media such as silver-coated ceramic beads. The present invention may be utilized as a sanitizer for swimming pools in conjunction with a pool filter.

BACKGROUND OF THE INVENTION

Water sanitizers using antimicrobial media are known in the art. Typically, these types of sanitizers are provided as independent, separately plumbed units which hold the sanitizing media in the flow path of the water to be treated. In such installations, the sanitizers are usually plumbed after the filter so that only clean, filtered water passes through the sanitizing media. This prevents fouling of the sanitizing media with contaminants present in the water. Vessels for holding the sanitizing media can be fairly expensive due to the need to resist internal pressure and the need for a pressure tight access cover. In addition, a separate sanitizer vessel requires additional space, and can increase product and installation costs. To limit the flow restriction caused by passing fluid at a high flow rate through sanitizing media, these devices commonly use some type of a fluid bypass. Unfortunately, this limits the amount of fluid that actually contacts the media.

A need remains, therefore, for conveniently and economically providing a sanitizer to work in conjunction with a variety of filter systems.

SUMMARY OF THE INVENTION

The problems and disadvantages associated with the conventional techniques and devices utilized to sanitize fluids are overcome by the present invention which involves a sanitizer adapted for positioning within a filter. The sanitizer includes a housing with an inner wall at least partially enclosing an inner hollow. An outer wall is spaced from the inner wall so as to form a chamber therebetween. Sanitizing media is contained within the chamber. The housing has a plurality of openings therein to allow fluid flowing through the filter to pass through the housing and contact the sanitizing media.

BRIEF DESCRIPTION OF THE DRAWINGS

For a better understanding of the present invention, reference is made to the following detailed description of three exemplary embodiments considered in conjunction with the accompanying drawings, in which.

DETAILED DESCRIPTION OF THE EXEMPLARY EMBODIMENTS

Figure 1:
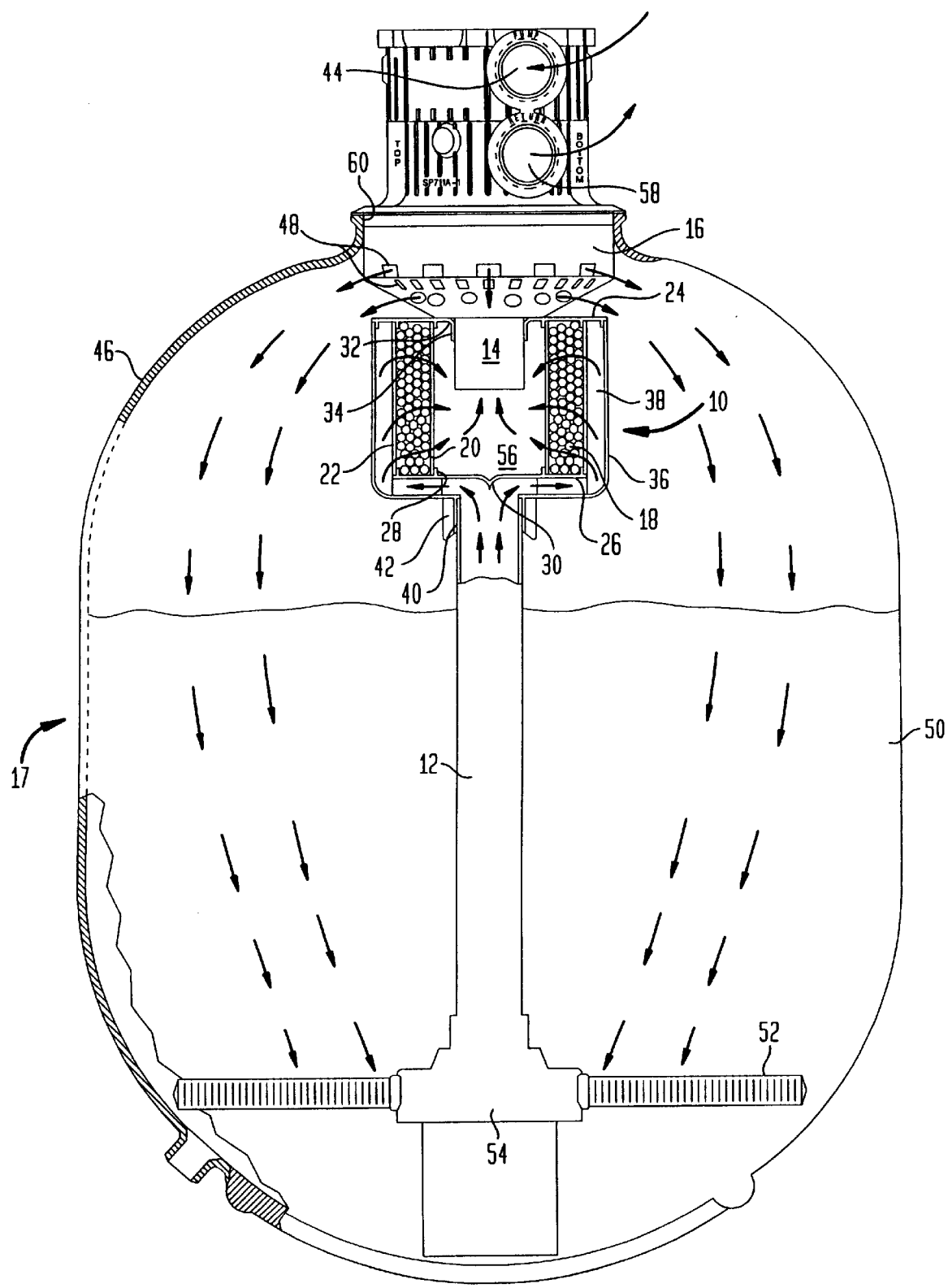
FIG. 1 is a partial cross-sectional view of a filter in filtration mode and having a sanitizer which is constructed in accordance with a first exemplary embodiment of the present invention.

FIG. 1 shows a first embodiment of the present invention, wherein sanitizer 10 is positioned in the flow path between standpipe 12 and central port 14 of conventional multi-port valve 16. The multiport valve 16 controls fluid flow into and out of filter 17 and determines whether the filter 17 is in filtration or backwash mode. In FIG. 1, the filter 17 is in filtration mode. The sanitizer 10 has an annular packed bed of sanitizer media 18 that is contained between perforated inner tube 20 and perforated outer tube 22. The perforations in tubes 20, 22 allow fluid to flow through the side walls of tubes 20, 22 and through the bed of sanitizer media 18.

The sanitizer media 18 may be made of any known bactericidal, germicidal, algaecidal or biocidal substances. Silver-based bactericides or biocides, such as elemental silver-coated or silver impregnated carriers, divalent silver compositions and trivalent silver compositions are particularly effective for certain applications. Electrolytic metal combinations including silver and copper, copper and zinc or other combinations may also be used. Chlorine based compositions, as well as activated carbon, may be used. A description of sanitizer media and methods for making sanitizer cartridges is disclosed in a prior patent application Ser. No. 09/014,448 entitled "Filter/Sanitizer and Method of Using Same" and owned by the Assignee of the present application, now U.S. Pat. No. 6,004,758, which such patent is incorporated by reference herein.

The bed of sanitizer media 18 is contained between the tubes 20, 22 by end caps 24, 26 which have concentric channels provided on an inner surface thereof for gluing, snapfitting, or melt merging to the inner and outer tubes 20, 22. The lower end cap 26 has a cusp 30 to smooth fluid flow around the lower end cap 26. The upper end cap 24 has a central outlet 32 which receives the central port 14 of the multiport valve 16. To facilitate insertion of the port 14, the outlet 32 is preferably provided with a chamfered edge 34. The sanitizer media 18 contained between the end caps 24, 26 is further enclosed within an outer capsule 36 which forms a seal with the upper end cap 24. The outer capsule 36 is concentrically spaced from the outer tube 22 defining a peripheral channel 38 for fluid to flow around the outer tube 22 and through the perforations thereof to contact the sanitizer media 18. In filtration mode, the fluid passes through the perforated inner tube 20 after contacting the sanitizer media 18 and then enters the central port 14 of the multiport valve 16. The outer capsule 36 has an inlet 40 for receiving the standpipe 12. A plurality of support ribs 42 extends radially from the inlet 40, each of the support ribs 42 having an end which tapers inwardly towards the inlet 40 to facilitate placement of the inlet 40 over the standpipe 12.

FIG. 1 depicts the filter/sanitizer combination in filtration mode, namely with an inlet flow of unfiltered fluid entering via pump port 44 of the multiport valve 16 and then flowing into filter housing 46 through a plurality of diffuser orifices 48 in the multiport valve 16. Backwash and filtration mode are selected by the user by positioning a handle at the top of the valve 16 which controls the internal valve position. Because multiport valves are conventional, the details of same are not shown, e.g., the valve cover and valve position selector handle are not shown. After entering the interior of the filter housing 46, the water passes through a sand bed 50 and lateral assemblies 52 to a central collector 54, which communicates with the standpipe 12. Fluid passing through the standpipe 12 enters the sanitizer 10 through the inlet 40 and is directed around cusp 30 along the bottom surface of the lower end cap 26 and into the peripheral channel 38. The flow then penetrates outer tube 22 to come in contact with the sanitizer media 18 and then through the inner tube 20 to a central chamber 56. Having been filtered and sanitized, the water exits central chamber 56 and enters the central port 14, passing from the multiport valve 16 through a return outlet 58 back to the swimming pool or other repository for filtered and sanitized water.

FIG. 1 shows an embodiment of the invention wherein all the water that passes through the sanitizer 10 has been previously filtered by the sand bed 50 and the lateral assemblies 52 such that the perforated tubes 20, 22 and the bed of sanitizer media 18 are not clogged with debris from the swimming pool. It should be appreciated that the size of the inner and outer tubes 20, 22, the spacing therebetween, and the thickness and density of the bed of sanitizer media 18 can all be varied to increase the surface area of the sanitizer media through which water has passed and to change the open area ratio and resistance to flow which is associated with passing the water through the sanitizer 10. The peripheral channel 38 is preferably provided with adequate cross-sectional area and generous radii to minimize frictional losses. The axisymmetric design of the sanitizer 10 is intended to deliver an even fluid flow to all areas of the sanitizer media 18 and to provide the bed of sanitizer media 18 with a large surface area, resulting in a relatively low flow rate per unit area or flow density. Keeping the flow density low minimizes resistance to flow. The provision of a large surface area also minimizes the bed thickness, for a given volume of sanitizer media. Keeping the bed thin also minimizes resistance to flow.

The outside diameter of the capsule 36 of the sanitizer 10 is designed to fit through a top access opening 60 in the filter housing 46. The height of the sanitizer 10 is kept to a minimum so that the device sits above the sand bed 50. The sanitizer 10 disclosed herein can be retrofitted to an existing sand filter by first removing the multiport valve 16 and then lowering the sanitizer 10 onto the standpipe 12. Chamfers 34 and ribs 42 have been added to ease installation (see FIG. 1). Normally, in a sand filter, the standpipe slips into the central port 14 of the multiport valve 16. To accommodate the sanitizer 10 between the standpipe 12 and the multiport valve 16, the normally sized standpipe 12 may be replaced with a shorter one or the existing standpipe can be shortened. The multiport valve 16 is then lowered onto the sanitizer 10 so that the central port 14 on the multiport valve 16 enters the central outlet 32, with chamfer 34 acting as a lead in. Accordingly, a sanitizer 10 in accordance with the present invention can be utilized to retrofit an existing sand filter to add the sanitizing function provided by the bed of sanitizer media 18 to assist in destroying unwanted bacteria, algae, spores, etc.

Figure 2:
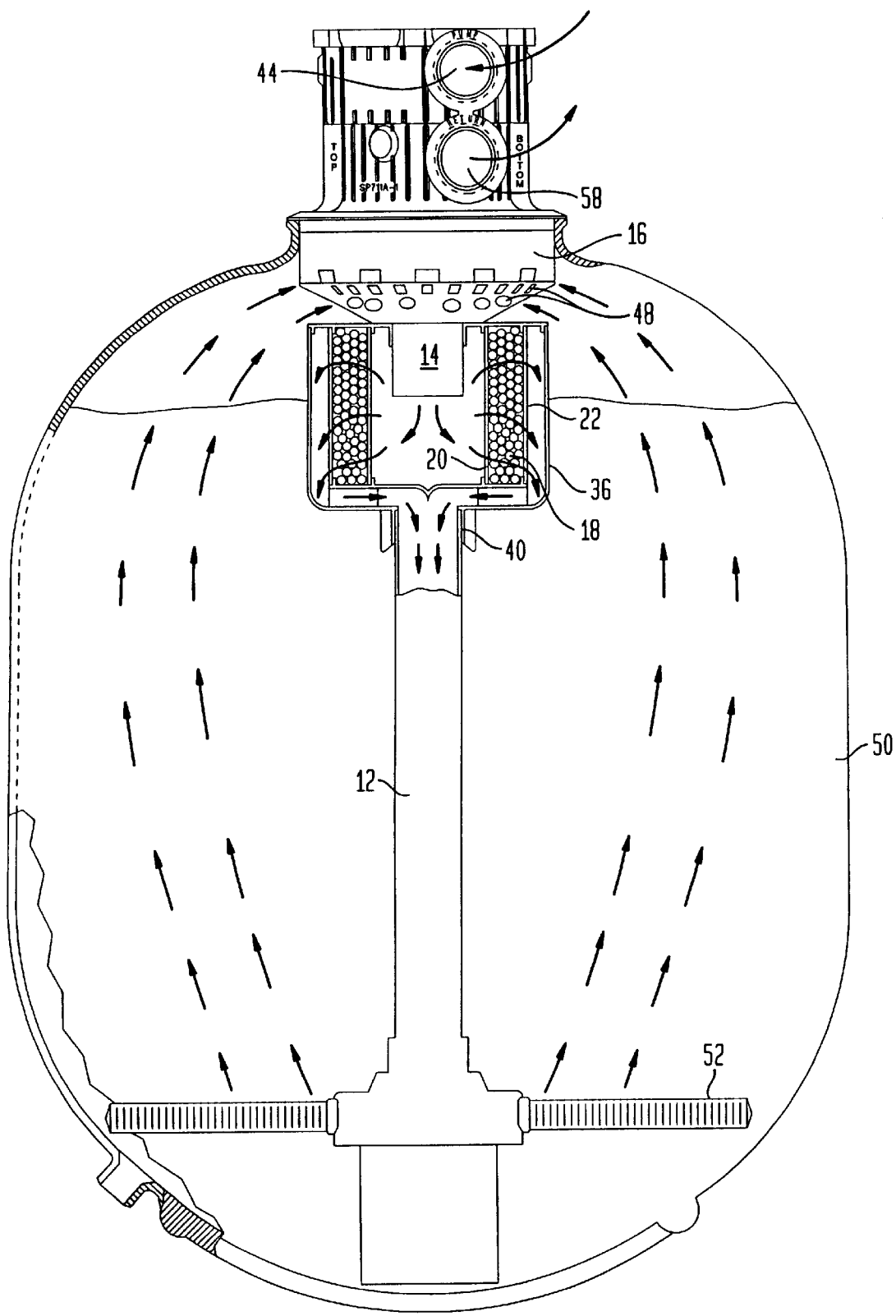
FIG. 2 is the filter/sanitizer of FIG. 1 in backwash mode.

FIG. 2 shows the fluid flow path through the filter/sanitizer combination of FIG. 1 during backwash mode. Backwashing is occasionally necessary to cleanse the sand bed 50 of accumulated contaminants. During backwash, the sand bed 50 is fluidized, i.e., the particles of sand are spaced apart by fluid entering the sand bed 50 in a decompressing direction. This is indicated in FIG. 2 by an increased level of the sand bed 50. To enter backwash mode, the handle of the multiport valve 16 would be moved to backwash position which would internally change the fluid connectivity of the valve ports. The pump is generally shut off before changing valve positions. In backwash mode, the flow path is essentially the reverse of that during filtration except that the fluid exits the multiport valve 16 through a wasteport on the back of the valve (not shown).

During backwash, the fluid entering via the pump port 44 has not been filtered. Clogging of the sanitizing media bed 18 does not constitute a problem, however, since the time spent in backwash mode is generally very short compared to that of normal filtration operation. In addition, any contaminants which get trapped in the sanitizer 10 during backwash tend to be flushed out when the flow is reversed, i.e., when normal filtering operation is resumed. Most importantly, dirty backwash fluid containing dirt that was filtered by the sand bed 50 never flows through the sanitizer 10 but instead passes through the diffuser orifices 48 on its way to the wasteport.

Elements illustrated in FIGS. 3–6 and 7–8 which correspond to elements described above in FIGS. 1 and 2 have been designated by corresponding reference numerals increased by one hundred and two hundred, respectively.

FIGS. 3–6 show an alternative sanitizer 110 that is installed over diffuser outlets 148 of a multiport valve 116 and which can be retrofitted to an existing filter 117 without any filter modification or replacement of parts. No modification to a normal length standpipe 112 is required because the sanitizer 110 does not disturb the normal connection between the standpipe 112 and the multiport valve 116.

Figure 4:
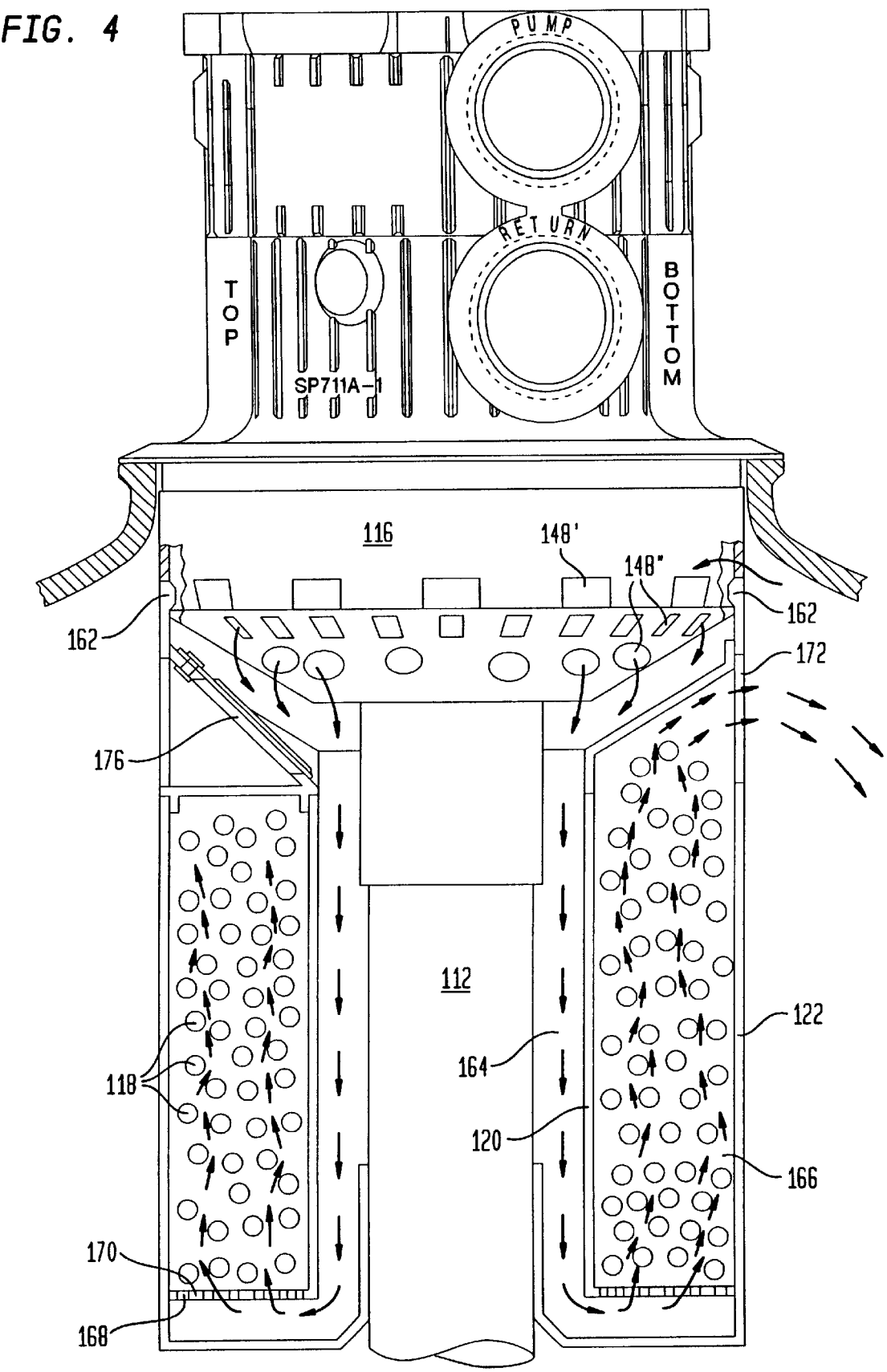
FIG. 4 is an enlarged, cross-sectional view of the sanitizer of FIG. 3.

FIG. 4 illustrates a convenient means of attaching the sanitizer 110 to the multiport valve 116, viz., by retainer fingers 162 which are provided on the upper peripheral edge of the sanitizer 110. The fingers 162 engage aligned, upper diffuser orifices 148' on the multiport valve 116, providing an easy means of installing and removing the sanitizer 110 on the multiport valve 116. Unlike the previous embodiment, unfiltered water flows through sanitizer 110 during filtration. Features have been incorporated in sanitizer 110 to prevent clogging by contaminants in the unfiltered fluid as described below.

Figure 3:
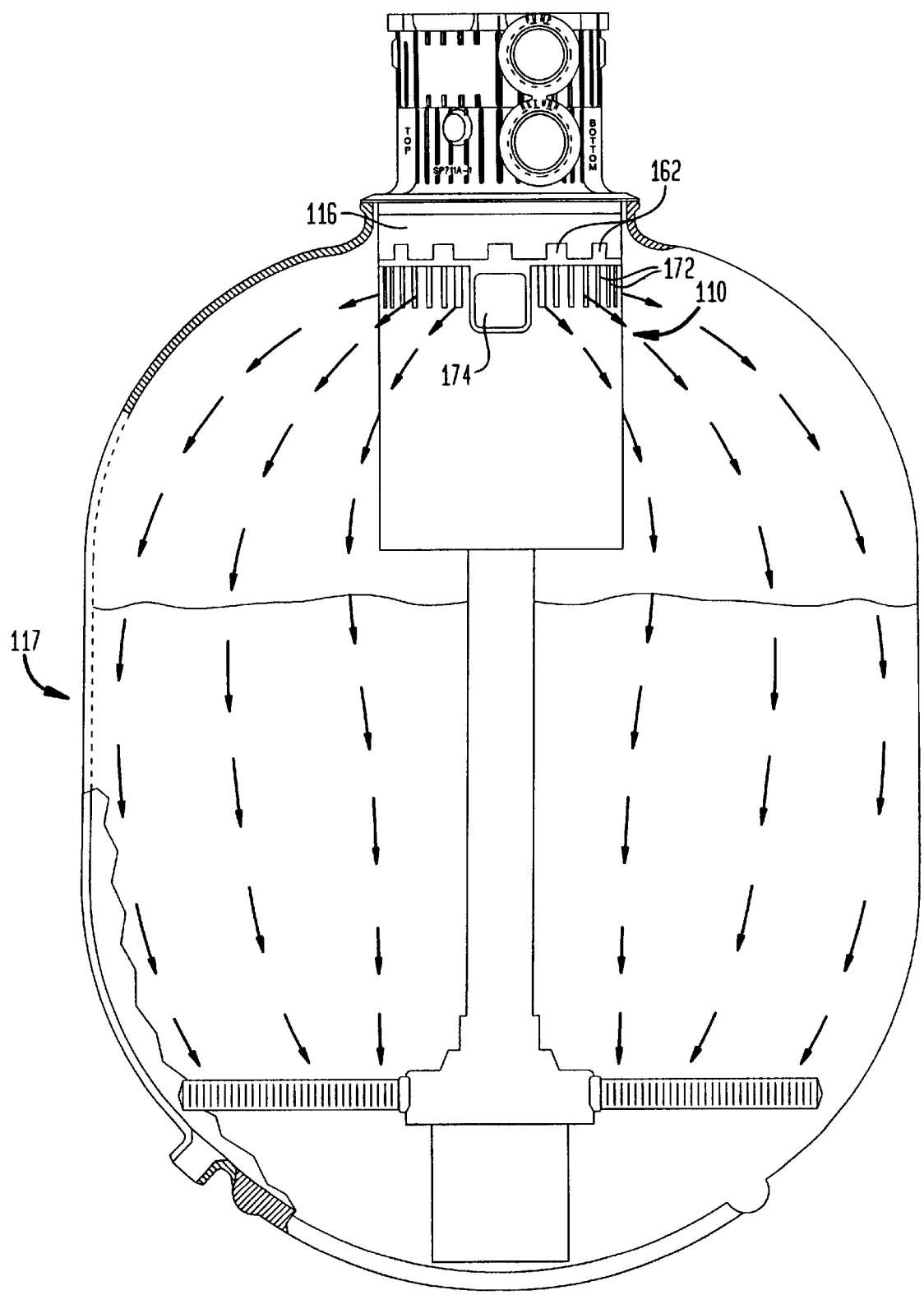
FIG. 3 is a partial cross-sectional view of a filter in filtration mode and having a sanitizer which is constructed in accordance with a second exemplary embodiment of the present invention.

FIGS. 3 and 4 illustrate the depicted sanitizer/filter combination in filtration mode. Fluid to be filtered enters the sanitizer 110 through lower diffuser orifices 148" in the multiport valve 116 and then travels down an annular passageway 164 formed by the standpipe 112 and an inner wall 120 of media chamber 166. Slots 168 in a bottom plate 170 of the media chamber 166 allow fluid flow into a bed of sanitizer media 118. As the fluid passes through the sanitizer media 118, it causes it to lift and separate, resulting in a fluidized media bed which is not prone to clogging by contaminants. The frictional losses associated with flow through such a fluidized bed 118 are much less than they are through a packed bed with the same area and the same media volume. The fluidized bed of sanitizer media 118 acts as a self-regulating bypass, with the individual media particles or beads moving further apart as the flow rate increases. The fluid exits the sanitizer 110 through a series of vertical outlet slots 172 in an outer wall 122 of the media chamber 166. As with the slots 168 in the bottom plate 170, it is preferred that slots 172 are small enough to prevent particles of media 118 from passing therethrough.

To ensure that all of the fluid passing through the multiport valve 116 flows through the sanitizer 110, the upper row of diffuser ports 148' are blocked by the fingers 162. To decrease assembly/disassembly resistance, a plurality of the fingers 162 may lack an inward projection that engages the orifices 148'. At least two of the fingers 162 should have inward projections to establish a snap fit with the orifices 148'. The sanitizer 110 may have the same outside diameter as the multiport valve 116 near the diffuser orifices 148' so that it easily fits into the filter 117.

Figure 5:
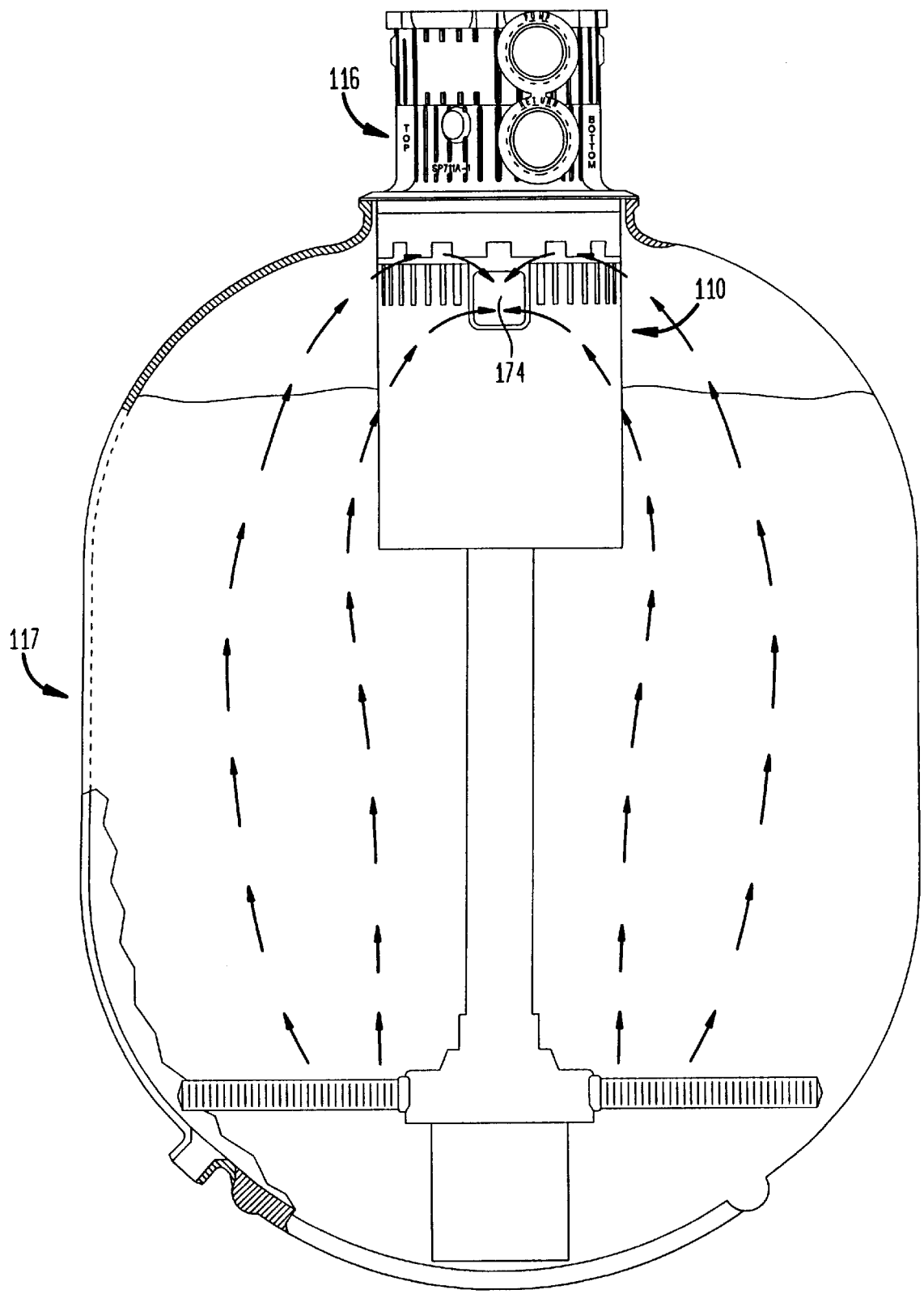
FIG. 5 is the filter/sanitizer of FIG. 3 in backwash mode.
Figure 6:
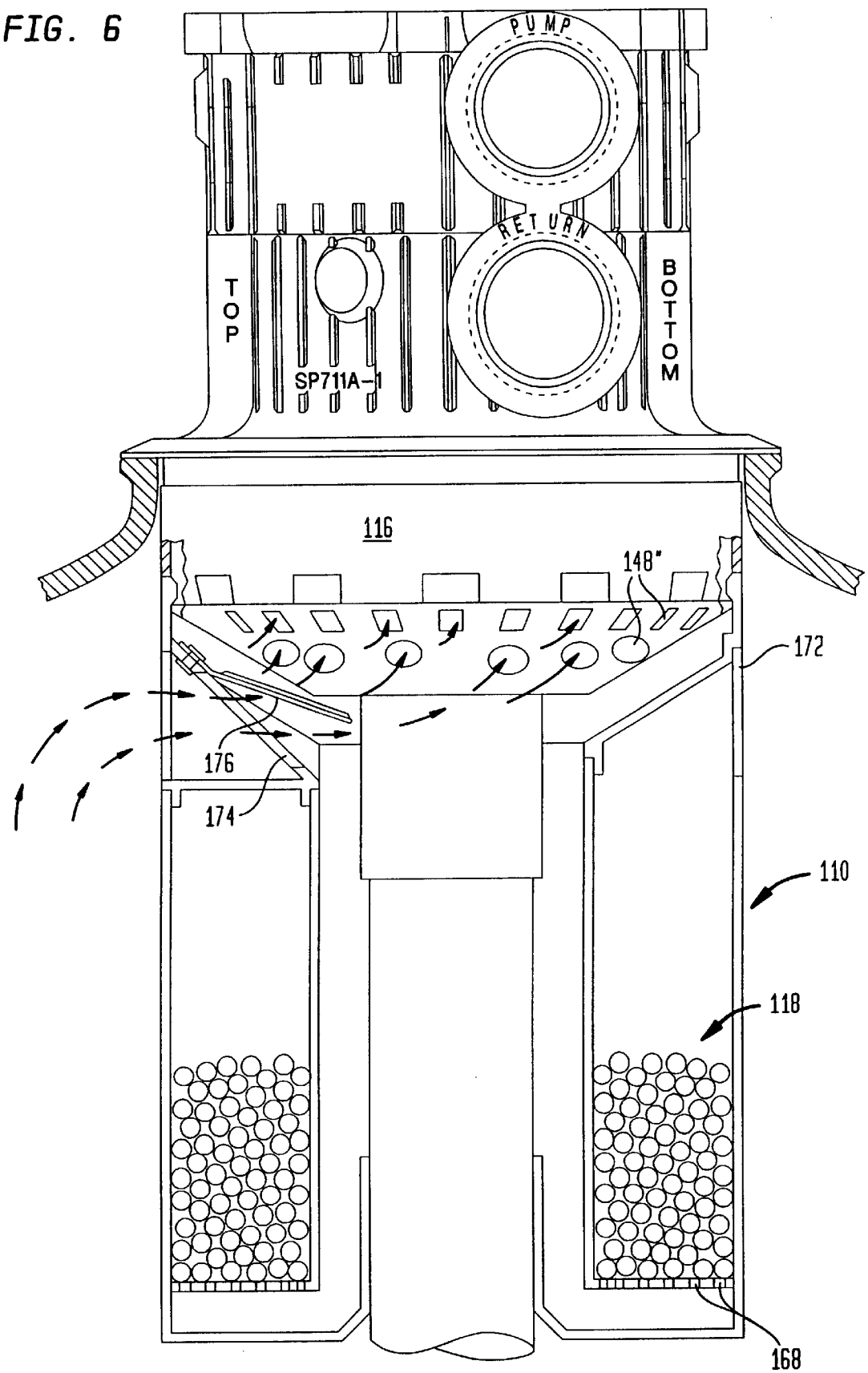
FIG. 6 is an enlarged, cross-sectional view of the sanitizer of FIG. 5.

FIGS. 5 and 6 illustrate the depicted filter/sanitizer in backwash mode. To prevent clogging of the sanitizer media 118 and the slots 168, 172 which would occur by passing the backwash fluid through the sanitizer 110 in the reverse direction, a bypass port 174 and a flapper valve 176 are provided. The valve 176, which is closed during filtration, is opened by the force of the fluid when the fluid flow is reversed for backwashing, as shown. The opening of valve 176 creates a primary path for fluid flow from the interior of the filter 117 to the diffuser orifices 148' of the multiport valve 116 as shown by the arrows in FIG. 6.

It is desirable to minimize the flow of the contaminated backwash fluid through the sanitizer 110 to minimize clogging of the sanitizer media 118 and the slots 168, 172. To this end, the fluid resistance through the bypass port 174 is designed to be minimal and significantly less than the reverse flow through the sanitizer 110. The fluid flow rates through the two paths are determined by the relative fluid resistance in each path. The features which keep the fluid resistance low in the bypass path are a large open area of the bypass port 174, short flow path length, and minimal number of turns. Additional flapper valves and ports can be incorporated to further reduce the fluid restriction and to also provide for a more balanced flow. In contrast, during backwashing, the bed of sanitizer media 118 is compressed, rather than fluidized, causing the fluid resistance through the bed to be increased. This is advantageous in that it reduces the amount of reverse flow through the sanitizer 110 during backwashing.

Figure 7:
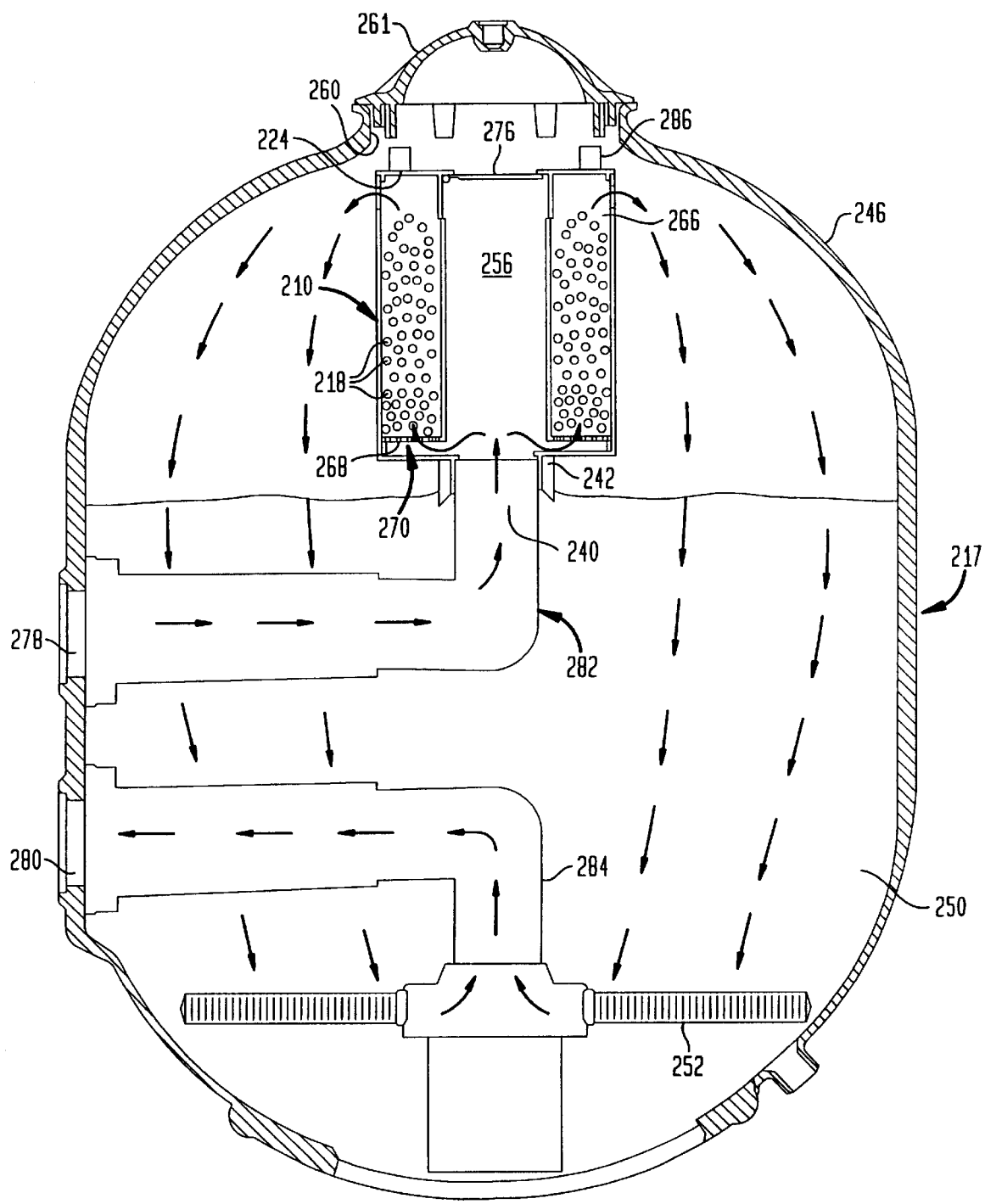
FIG. 7 is a partial cross-sectional view of a filter in filtration mode and having a sanitizer which is constructed in accordance with a third exemplary embodiment of the present invention.
Figure 8:
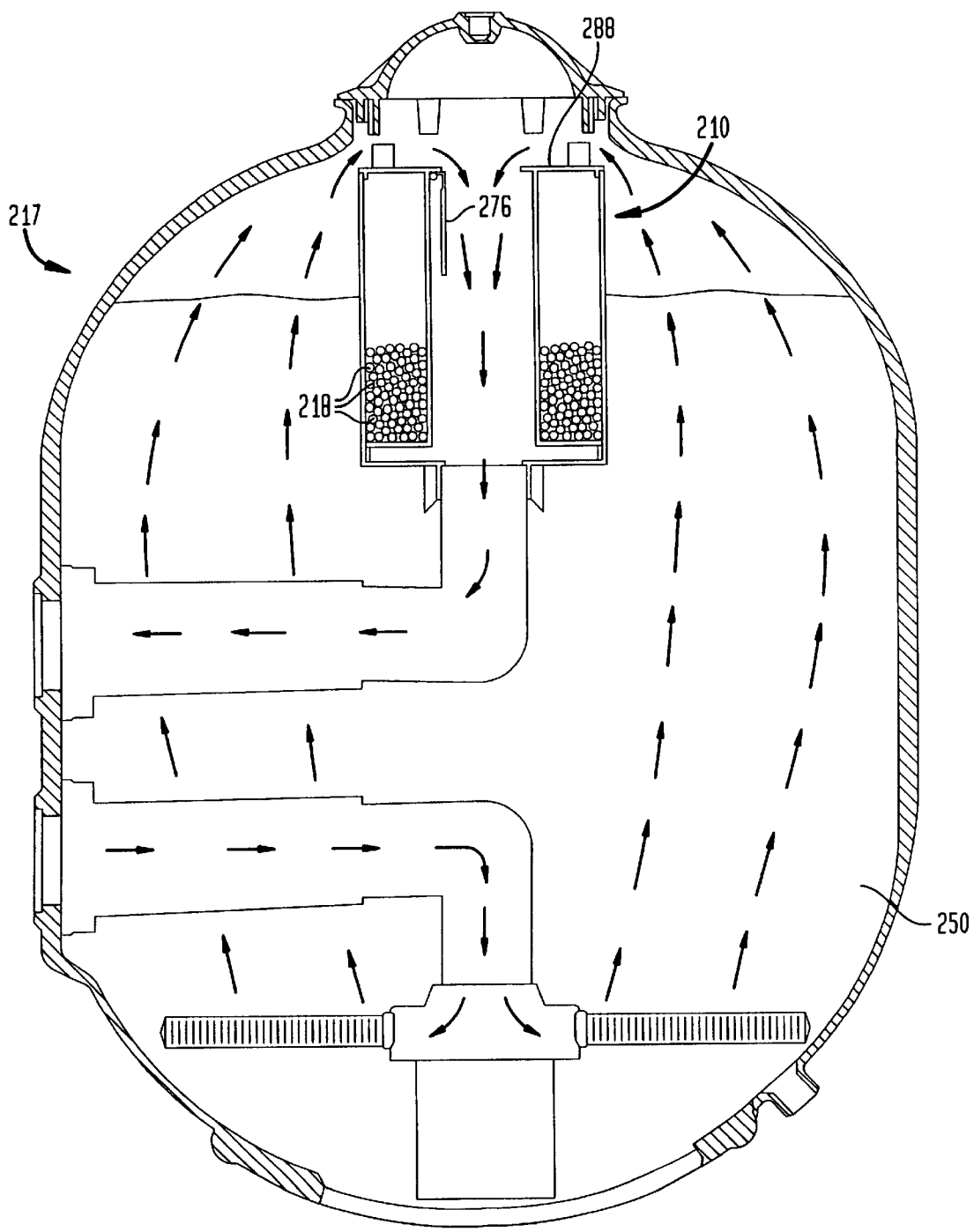
FIG. 8 is the filter/sanitizer of FIG. 7 in backwash mode.

FIGS. 7 and 8 illustrate another embodiment of the present invention, viz., with a sanitizer 210 installed in a filter 217 with side ports 278, 280. As shown, the sanitizer 210 has a similar configuration to that of sanitizer 110 described above in relation to FIGS. 3–6, but is used in a side mount sand filter 217. The sanitizer 210 is in the form of a canister and is installed through an access opening 260 and onto an elbow 282 which acts as the fluid inlet during filtration. The opening 260 is then sealed by an access cover 261. Chamfered ribs 242 ease installation of the sanitizer 210 on the elbow 282. Sand filters commonly have a diffuser which is slip fitted onto the elbow 282 in the same position as the sanitizer 210. On a retrofit installation, the original diffuser would be removed prior to installation and replaced with the sanitizer 210.

The filtering fluid flow path is shown in FIG. 7, wherein fluid flows in inlet 278, through the elbow 282 and into an inlet 240 of the sanitizer 210. A central chamber 256 is occluded at one end by a flapper/float valve 276 and vents into a media chamber 266 via slots 268 in a bottom plate 270. The fluid to be filtered passes through a bed of sanitizer media 218 fluidizing it and then exiting the media chamber 266 via outlet slots 272 into filter housing 246. The fluid then passes through a sand bed 250, into a lateral assembly 252, out elbow 284 and through side port 280. To prevent the sanitizer 210 from "floating" off of the elbow 282, a series of radially disposed projections 286 are incorporated into an upper end cap 224 to limit the vertical travel of the sanitizer 210 by contacting the filter access cover 261.

FIG. 8 illustrates the depicted filter/sanitizer combination in backwash mode. As with the embodiment of FIGS. 3–6, a bypass port 288 is controlled by the valve 276 so as to provide a free flow path for backwash fluid passing through the sanitizer 210. As a consequence, backwashing fluid largely bypasses the bed of sanitizer media 218 by traveling through the bypass port 288. It should be noted that the vertical slots 272 which form the discharge ports act as a diffuser, in that they distribute the flow in a radial direction during filtration so as to avoid disturbing the sand bed 250. The slots 272 are located as high in the filter 217 as possible to avoid the intake of sand from the fluidized sand bed 250 in backwash mode.

All embodiments of the present invention provide the ability to retrofit a filter with a sanitizer without the addition of a separate pressure vessel. They also allow full fluid flow through the sanitizing media bed with minimal fluid restriction thus leading to long service life of the media.

The sanitizer 10 of FIGS. 1 and 2 is a "clean water" design, wherein all of the water that passes through it, during normal operation, has been previously filtered. This design utilizes a packed bed configuration with the media contained by inner and outer perforated tubes 20, 22 and non-perforated endcaps 24, 26. It is particularly well suited to "top-mount" sand filters, like the filter 17, where a multiport valve 16 is mounted on the top of the filter.

The sanitizer 110 of FIGS. 3–6 is a "dirty water" design, wherein none of the water that passes through it, during normal filtering operation, has been filtered. This design utilizes a fluidized bed configuration to minimize fluid restriction. The use of a fluidized bed should also minimize clogging of the sanitizer media due to contaminants in the influent. This design is intended for use with "top-mount" sand filters, like the filter 117.

The sanitizer 210 of FIGS. 7 and 8 is essentially the same design as the sanitizer 110 of FIGS. 3–6. However, the sanitizer 210 has been especially adapted for use with "side-mount" sand filters, like the filter 217.

It should be noted that the embodiments described herein are merely exemplary and that a person skilled in the art may make many variations and modifications without departing from the spirit and scope of the invention. For example, while the present invention has been explained in terms of use for sanitizing water, any fluids could be sanitized by the present invention. Accordingly, all such variations and modifications are intended to be included within the scope of the invention as defined in the appended claims.

What is claimed is:

1. A sanitizer for use in conjunction with a filter, comprising:

a housing sized and shaped to be accommodated within an associated filter and having an inner wall at least partially enclosing an inner hollow, an outer wall spaced from said inner wall so as to define a chamber therebetween; and sanitizing media contained within said chamber, said housing having a plurality of openings therein to allow fluid flowing through an associated filter in which said sanitizer has been inserted to pass through said housing and contact said sanitizing media, said housing including a top attached at a first end of said inner wall and at a first end of said outer wall and a bottom attached at a second end of said inner wall and at a second end of said outer wall and forming top and bottom surfaces defining said chamber, said bottom and said outer wall each having a plurality of openings therein allowing fluid to flow through and contact said media contained in said chamber.

2. The sanitizer of claim 1, wherein said sanitizer attaches to a diffuser of an associated filter in fluid communication with a plurality of diffuser outlets, said sanitizer having a fluid routing member attached to said outer wall and extending radially inward therefrom to a lower passageway, said fluid routing member spaced from said bottom wall to conduct fluid therebetween, said lower passageway accommodating a fluid conduit of the associated filter passing therethrough such that fluid exiting said diffuser passes over said top and between said filter conduit and said inner wall and between said routing member and said bottom, fluid passing through said plurality of openings in said bottom wall, through said media and through said plurality of openings in said outer wall when the associated filter is in filtration mode.

3. The sanitizer of claim 2, wherein said sanitizer has at least one backwash passage extending through said sanitizer such that backwash fluid can flow from inside an associated filter to said plurality of diffuser conduits without contacting said media, flow through said backwash passage being controlled by a one-way valve.

4. The sanitizer of claim 3, wherein said media is an unpacked aggregation such that fluid flowing through said media chamber when an associated filter is in filtration mode tends to create a fluidized bed.

5. The sanitizer of claim 4, wherein unfiltered fluid passes through said sanitizer when an associated filter is in filtration mode.

6. The sanitizer of claim 5, wherein said media bed contracts to approximate a packed bed when an associated filter is in backwash mode.

7. The sanitizer of claim 1, wherein said sanitizer is installed on a fluid inlet of a side port filter, said sanitizer having a circumference permitting said sanitizer to be introduced into a side port filter through a top access opening therein.

8. The sanitizer of claim 1, wherein said inner wall and said outer wall are both generally cylindrical in shape such that said sanitizer is in the form of a generally cylindrical canister, and further including a fluid routing member attached to said outer wall and extending radially inward therefrom to a lower fluid passageway, said fluid routing member spaced from said bottom to conduct fluid therebetween, said lower fluid passageway communicating with a fluid conduit of said filter, such that fluid entering said lower fluid passageway enters said inner hollow and said space between said routing member and said bottom, passes through said plurality of openings in said bottom, through said media and through said plurality of openings in said outer wall into the interior of said filter when said filter is in filtration mode.

9. The sanitizer of claim 8, wherein said top has an upper fluid passage communicating with said inner hollow and further including a one-way float valve controlling the passage of fluid through said upper fluid passage, said float valve closing when the level of fluid in said inner hollow rises toward said top, said float valve opening in backwash mode to permit free flow of fluid through said inner hollow and into said filter conduit.

10. The sanitizer of claim 9, further including at least one spacer extending from said top, said spacer interacting with said filter to prevent said sanitizer from inadvertently becoming detached from said fluid inlet.

11. The sanitizer of claim 9, wherein said media is an unpacked aggregation such that fluid flowing through said media bed during filtering mode tends to create a fluidized bed.

12. The sanitizer of claim 11, wherein said media bed contracts to approximate a packed bed when said filter is in backwash mode, thereby diminishing the amount of fluid flow through the sanitizing media when in backwash mode.

13. The sanitizer of claim 1, wherein said filter is a sand filter and said sanitizer is positioned to receive an unfiltered flow of fluid exiting a plurality of diffuser ports of a multiport valve of said sand filter, said sanitizer coaxially positioned around a junction of a central inlet port of said multiport valve and a standpipe emanating from a lateral assembly of said sand filter.

14. The sanitizer of claim 1, wherein said filter is a sand filter and said sanitizer is attached to an end of an inlet conduit receiving unfiltered inlet flow in a side-port of said sand filter, said sanitizer acting as a diffuser.

15. A sanitizer for use in conjunction with a sand filter having a top mounted control valve and an internal lateral assembly within the filter proximate the bottom thereof, the lateral assembly being covered by a layer of sand, with a standpipe in fluid communication with the lateral assembly and extending towards the control valve, comprising:

a housing sized and shaped to be accommodated within the filter and having an inner wall at least partially enclosing an inner hollow, an outer wall spaced from said inner wall so as to define an annular space therebetween;

a top attached at a first end of said inner wall and at a first end of said outer wall and a bottom attached at a second end of said inner wall and at a second end of said outer wall, said top and said bottom delimiting said annular space and defining a chamber, said top having a fluid passage therein communicating with said inner hollow;

sanitizing media contained in said chamber, said inner wall and said outer wall each having a plurality of openings therein allowing fluid flowing through the filter in which said sanitizer has been inserted to flow therethrough and contact said sanitizing media contained in said chamber; and an outer capsule surrounding said outer wall and said bottom with a peripheral space between said outer capsule and said outer wall and between said outer capsule and said bottom, said peripheral space for conducting a fluid therethrough, said outer capsule attaching at an upper end thereof to said top, said outer capsule having a fluid passage therein communicating with said peripheral space to admit the fluid into said capsule for passage through said housing, said fluid passage in said top communicating with a conduit on said control valve and said fluid passage in said capsule communicating with said standpipe, said sanitizer being inserted in the fluid path between the control valve and the standpipe of the filter, whereby fluid admitted into the filter for filtration passes through the sand layer, through the lateral assembly, up the standpipe, through the sanitizer and then through the control valve.

16. The sanitizer of claim 15, wherein said media is a packed aggregate.

17. The sanitizer of claim 16, wherein said aggregate includes a silver-based bactericide.

18. The sanitizer of claim 15, wherein said fluid passage in said top and said fluid passage in said capsule have lead-in chamfers to facilitate positioned same over a mating filter conduit.

19. The sanitizer of claim 15, wherein said bottom has a cusp extending toward and aligned with said lower fluid passage to assist in smoothing fluid flow.

20. The sanitizer of claim 15, wherein said sanitizer is positioned within said filter above the level of sand in said filter when said filter is in filtration mode.

21. The sanitizer of claim 15, wherein said sanitizer is retrofitable to an existing filter previously not having a sanitizer.

* * * * *